(12) United States Patent
Fang et al.

(10) Patent No.: US 11,003,014 B2
(45) Date of Patent: May 11, 2021

(54) DISPLAY SUBSTRATE AND METHOD FOR MANUFACTURING THE SAME, DISPLAY PANEL AND DISPLAY DEVICE

(71) Applicant: BOE Technology Group Co., Ltd., Beijing (CN)

(72) Inventors: Zheng Fang, Beijing (CN); Ge Shi, Beijing (CN); Ming Zhu, Beijing (CN); Haijun Niu, Beijing (CN); Shiyu Zhang, Beijing (CN); Song Yang, Beijing (CN); Yujie Liu, Beijing (CN); Jiahui Han, Beijing (CN); Yuyao Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/599,491

(22) Filed: Oct. 11, 2019

(65) Prior Publication Data
US 2020/0117044 A1 Apr. 16, 2020

(30) Foreign Application Priority Data
Oct. 12, 2018 (CN) .......................... 201811191064.9

(51) Int. Cl.
*G02F 1/1335* (2006.01)
*G02F 1/13357* (2006.01)

(52) U.S. Cl.
CPC .. *G02F 1/133512* (2013.01); *G02F 1/133528* (2013.01); *G02F 1/133617* (2013.01); *G02F 1/133548* (2021.01)

(58) Field of Classification Search
CPC ........................................ G02F 2001/133548
See application file for complete search history.

(56) References Cited

U.S. PATENT DOCUMENTS

| 2007/0058107 A1* | 3/2007 | Im | G02F 1/133617 349/71 |
| 2008/0135175 A1* | 6/2008 | Higuchi | B32B 7/06 156/718 |

(Continued)

FOREIGN PATENT DOCUMENTS

| CN | 1847943 | * 10/2006 | ........... G02F 1/1335 |
| CN | 1847943 A | 10/2006 | |

(Continued)

OTHER PUBLICATIONS

First office action of Chinese application No. 201811191064.9 dated Dec. 21, 2020.

*Primary Examiner* — Sang V Nguyen
(74) *Attorney, Agent, or Firm* — Fay Sharpe LLP

(57) ABSTRACT

Disclosed are a display substrate and a method for manufacturing the same, a display panel and a display device. The display panel includes a carrier substrate; an adhesive layer, a color resist layer, a first flat layer and a metal wire grid layer that are distributed in a direction distal from the carrier substrate; and a light shielding pattern disposed between the adhesive layer and the first flat layer. A surface of the light shielding pattern proximal to the metal wire grid layer is in the same plane as a surface of the color resist layer proximal to the metal wire grid layer. The present disclosure contributes to increasing the yield of the metal wire grid layer and improving the display effect of the display panel.

19 Claims, 11 Drawing Sheets

(56) References Cited

U.S. PATENT DOCUMENTS

| | | | | |
|---|---|---|---|---|
| 2010/0073615 | A1* | 3/2010 | Yaguchi | G02F 1/133305 349/122 |
| 2013/0128196 | A1* | 5/2013 | Shinn | G02B 5/201 349/106 |
| 2014/0087503 | A1* | 3/2014 | Chang | G02F 1/1333 438/30 |
| 2016/0091757 | A1* | 3/2016 | Miki | G02F 1/133617 349/42 |
| 2016/0124265 | A1* | 5/2016 | Lee | C25D 11/022 349/43 |
| 2016/0357068 | A1* | 12/2016 | Yang | G02F 1/133621 |
| 2018/0019238 | A1* | 1/2018 | Kim | H01L 51/0512 |
| 2019/0033655 | A1* | 1/2019 | Abileah | G02F 1/133512 |
| 2019/0041695 | A1* | 2/2019 | Yin | G02F 1/133516 |
| 2020/0041838 | A1* | 2/2020 | Zha | G02F 1/133528 |
| 2020/0089048 | A1* | 3/2020 | Awaya | G02F 1/1335 |
| 2020/0089107 | A1* | 3/2020 | Lu | G03F 7/0002 |
| 2020/0271974 | A1* | 8/2020 | Cho | G02F 1/13318 |

FOREIGN PATENT DOCUMENTS

| | | | | |
|---|---|---|---|---|
| CN | 103091888 | A | 5/2013 | |
| CN | 104330918 | A | 2/2015 | |
| CN | 107390420 | A | 11/2017 | |
| CN | 107621718 | A | 1/2018 | |
| CN | 107664881 | A | 2/2018 | |
| CN | 108415193 | A | 8/2018 | |
| WO | WO03007066 | A2 | 1/2003 | |
| WO | WO 2003007066 | * | 1/2003 | G02F 1/1333 |

\* cited by examiner

DISPLAY SUBSTRATE AND METHOD FOR MANUFACTURING THE SAME, DISPLAY PANEL AND DISPLAY DEVICE

CROSS-REFERENCE TO RELATED DISCLOSURE

The present disclosure claims priority to Chinese Patent Application No. 201811191064.9, filed on Oct. 12, 2019 and entitled "DISPLAY SUBSTRATE, DISPLAY PANEL, DISPLAY DEVICE AND METHOD FOR MANUFACTURING DISPLAY SUBSTRATE", the entire contents of which are incorporated herein by reference.

TECHNICAL FIELD

The present disclosure relates to a display substrate and a method for manufacturing the same, a display panel and a display device.

BACKGROUND

A liquid crystal display (LCD) includes a liquid crystal display panel and a backlight source. The liquid crystal display panel includes an array substrate, a color film substrate, and a liquid crystal layer disposed therebetween. The array substrate and the color film substrate cooperate to deflect liquid crystals for display.

SUMMARY

Embodiments of the present disclosure provide a display substrate and a method for manufacturing the same, a display panel and a display device. The technical solutions of the present disclosure are as follows.

In one aspect, a display substrate is provided. The display substrate includes:

a carrier substrate;

an adhesive layer, a color resist layer, a first flat layer and a metal wire grid layer that are distributed in a direction distal from the carrier substrate; and a light shielding pattern disposed between the adhesive layer and the first flat layer;

wherein a surface of the light shielding pattern proximal to the metal wire grid layer is in the same plane as a surface of the color resist layer proximal to the metal wire grid layer.

Optionally, flatness of a surface of the first flat layer proximal to the color resist layer is greater than flatness of a surface of the first flat layer distal from the color resist layer.

Optionally, the display substrate further includes a protective layer disposed on one side of the metal wire grid layer distal from the carrier substrate.

Optionally, the display substrate further includes a second flat layer disposed between the adhesive layer and the color resist layer.

Optionally, the display substrate further includes a third flat layer disposed between the second flat layer and the color resist layer.

Optionally, flatness of a surface of the second flat layer proximal to the adhesive layer is greater than flatness of a surface of the third flat layer distal from the adhesive layer.

Optionally, the color resist layer includes at least one of a red color resist, a green color resist, or a blue color resist. The red color resist includes a red quantum dot layer, and the green color resist includes a green quantum dot layer.

Optionally, the color resist layer further includes a blue color resist, the blue color resist including a blue filter layer; and the red color resist further includes a red filter layer, and the green color resist further includes a green filter layer, wherein an orthographic projection of the red filter layer on the red quantum dot layer covers the red quantum dot layer, and an orthographic projection of the green filter layer on the green quantum dot layer covers the green quantum dot layer.

Optionally, the display substrate further includes:

a protective layer disposed on one side of the metal wire grid layer distal from the carrier substrate;

a second flat layer disposed between the adhesive layer and the color resist layer; and a third flat layer disposed between the second flat layer and the color resist layer, flatness of a surface of the second flat layer proximal to the adhesive layer being greater than flatness of a surface of the third flat layer distal from the adhesive layer, wherein the color resist layer includes at least one of a red color resist, a green color resist, or a blue color resist; the red color resist including a red quantum dot layer and a red filter layer, wherein an orthographic projection of the red filter layer on the red quantum dot layer covers the red quantum dot layer; the green color resist including a green quantum dot layer and a green filter layer, wherein an orthographic projection of the green filter layer on the green quantum dot layer covers the green quantum dot layer; and the blue color resist including a blue filter layer.

In another aspect, a display panel is provided. The display panel includes a display substrate, and the display substrate includes:

a carrier substrate;

an adhesive layer, a color resist layer, a first flat layer and a metal wire grid layer that are distributed in a direction distal from the carrier substrate; and a light shielding pattern disposed between the adhesive layer and the first flat layer;

wherein a surface of the light shielding pattern proximal to the metal wire grid layer is in the same plane as a surface of the color resist layer proximal to the metal wire grid layer.

Optionally, flatness of a surface of the first flat layer proximal to the color resist layer is greater than flatness of a surface of the first flat layer distal from the color resist layer.

Optionally, the display substrate further includes a protective layer disposed on one side of the metal wire grid layer distal from the carrier substrate.

Optionally, the display substrate further includes a second flat layer disposed between the adhesive layer and the color resist layer.

Optionally, the display substrate further includes a third flat layer disposed between the second flat layer and the color resist layer.

Optionally, flatness of a surface of the second flat layer proximal to the adhesive layer is greater than flatness of a surface of the third flat layer distal from the adhesive layer.

Optionally, the color resist layer includes at least one of a red color resist or a green color resist, wherein the red color resist includes a red quantum dot layer, and the green color resist includes a green quantum dot layer.

Optionally, the color resist layer further includes a blue color resist, the blue color resist includes a blue filter layer; and the red color resist further includes a red filter layer, and the green color resist further includes a green filter layer, wherein an orthographic projection of the red filter layer on the red quantum dot layer covers the red quantum dot layer, and an orthographic projection of the green filter layer on the green quantum dot layer covers the green quantum dot layer.

Optionally, the display substrate further includes:

a protective layer disposed on one side of the metal wire grid layer distal from the carrier substrate;

a second flat layer disposed between the adhesive layer and the color resist layer; and a third flat layer disposed between the second flat layer and the color resist layer, flatness of a surface of the second flat layer proximal to the adhesive layer being greater than flatness of a surface of the third flat layer distal from the side of the adhesive layer;

wherein the color resist layer includes at least one of a red color resist, a green color resist, or a blue color resist; the red color resist including a red quantum dot layer and a red filter layer, wherein an orthographic projection of the red filter layer on the red quantum dot layer covers the red quantum dot layer; the green color resist including a green quantum dot layer and a green filter layer, wherein an orthographic projection of the green filter layer on the green quantum dot layer covers the green quantum dot layer; and the blue color resist including a blue filter layer.

Optionally, the display substrate is a color film substrate, and the display panel further includes:

an array substrate facing the display substrate; and a liquid crystal layer disposed between the array substrate and the display substrate.

In still another aspect, a display device is provided. The display device includes a backlight module and the display panel in the another aspect described above.

In a further aspect, a method for manufacturing a display substrate is provided. The method includes:

providing a base substrate and a carrier substrate;

forming a metal wire grid layer on one side of the base substrate;

forming a first flat layer on one side of the metal wire grid layer distal from the base substrate;

forming a light shielding pattern on one side of the first flat layer distal from the base substrate;

forming a color resist layer on one side of the first flat layer distal from the base substrate, wherein a surface of the color resist layer proximal to the metal wire grid layer is in the same plane as a surface of the light shielding pattern proximal to the metal wire grid layer;

forming an adhesive layer on one side of the color resist layer distal from the base substrate;

fixedly attaching the carrier substrate to a surface of the adhesive layer distal from the base substrate; and peeling off the base substrate to obtain the display substrate.

Optionally, prior to the forming a metal wire grid layer on one side of the base substrate, the method further includes: forming a protective layer on one side of the base substrate; and the forming a metal wire grid layer on one side of the base substrate includes: forming the metal wire grid layer on one side of the protective layer distal from the base substrate.

Optionally, upon the forming a color resist layer on one side of the first flat layer distal from the base substrate, the method further includes: forming a third flat layer on one side of the color resist layer distal from the base substrate; and the forming an adhesive layer on one side of the color resist layer distal from the base substrate includes: forming the adhesive layer on one side of the third flat layer distal from the base substrate.

Optionally, upon the forming a third flat layer on one side of the color resist layer distal from the base substrate, the method further includes:

forming a second flat layer on one side of the third flat layer distal from the base substrate, wherein flatness of a surface of the second flat layer distal from the color resist layer is greater than flatness of a surface of the third flat layer proximal to the color resist layer; and the forming the adhesive layer on one side of the third flat layer distal from the base substrate includes: forming the adhesive layer on one side of the second flat layer distal from the base substrate.

Optionally, the forming a color resist layer on one side of the first flat layer distal from the base substrate includes:

forming a quantum dot color film layer on one side of the first flat layer distal from the base substrate, the quantum dot color film layer including a red quantum dot layer and a green quantum dot layer; and forming a filter color film layer on the base substrate on which the quantum dot color film layer is formed, wherein the filter color film layer includes a red filter layer, a green filter layer and a blue filter layer; an orthographic projection of the red filter layer on the red quantum dot layer covering the red quantum dot layer, and an orthographic projection of the green filter layer on the green quantum dot layer covering the green quantum dot layer.

Optionally, the forming a metal wire grid layer on one side of the base substrate includes:

forming a metal layer on one side of the base substrate;

forming an imprinted adhesive layer on one side of the metal layer distal from the base substrate;

imprinting the imprinted adhesive layer by nanoimprinting to obtain an imprinted pattern;

etching the imprinted pattern and the metal layer; and peeling off the remaining imprinted pattern to obtain the metal wire grid layer.

Optionally, prior to the forming a protective layer on one side of the base substrate, the method further includes: forming an adhesive layer on one side of the base substrate; and the forming a protective layer on one side of the base substrate includes: forming the protective layer on one side of the adhesive layer distal from the base substrate; and the peeling off the base station includes: performing heat treatment on the base substrate from one side of the base substrate distal from the carrier substrate such that the adhesive layer fails, and peeling off the base substrate.

DETAILED DESCRIPTION

For clearer descriptions of the principle, technical solutions and advantages of the present disclosure, some embodiments of the present disclosure are described in detail with reference to the accompanying drawings.

A liquid crystal display panel generally includes an array substrate, a color film substrate, and a liquid crystal layer disposed therebetween. The array substrate and the color film substrate cooperate to deflect liquid crystals for display.

Figure 1:
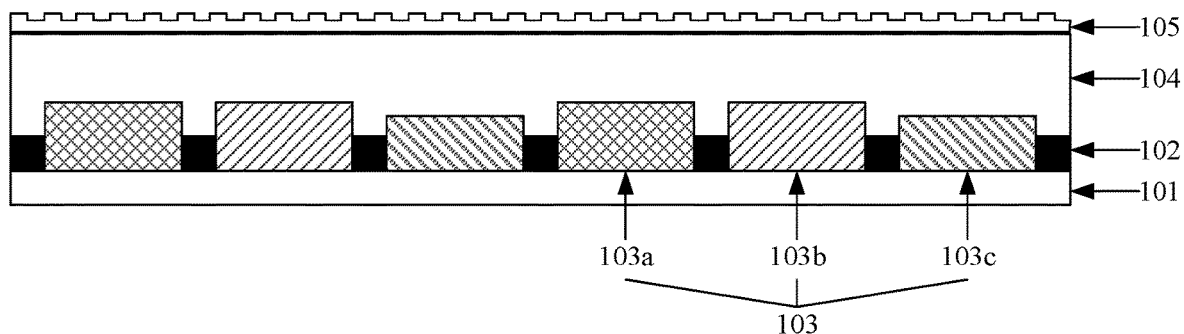
FIG. 1 is a schematic structural diagram of a color film substrate known to the inventors.
Figure 2:
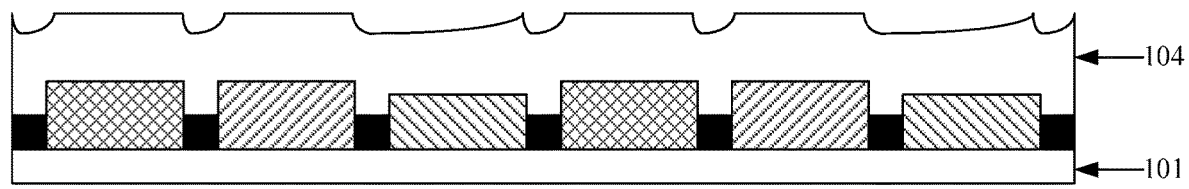
FIG. 2 is a schematic structural diagram showing part of the color film substrate as illustrated in FIG. 1.

FIG. 1 is a schematic structural diagram of a color film substrate 10 known to the inventors. As illustrated in FIG. 1, the color film substrate 10 includes a base substrate 101, and a black matrix 102, a color resist layer 103, a flat layer 104 and a metal wire grid layer 105 that are disposed on the base substrate 101. The color resist layer 103 includes a red color resist 103a, a green color resist 103b, and a blue color resist 103c. A manufacturing process of the flat layer 104 generally includes: depositing a flat layer material on one side of the color resist layer 103 distal from the base substrate 101; and curing the deposited flat layer material (for example, the flat layer material is cured by ultraviolet irradiation). However, during the curing process, the flat layer material may be polymerized, resulting in shrinkage of the flat layer 104. In the presence of the color resist layer 103, a segment difference exists on a surface of the flat layer 104 proximal to the base substrate 101 (that is, a surface of the flat layer 104 proximal to the base substrate 101 is uneven). Therefore, shrinkage degrees of different regions on the flat layer 104 are different, resulting in poor flatness of the surface of the flat layer 104 distal from the base substrate 101. Exemplarily, FIG. 2 is a schematic structural diagram showing part of the color film substrate as illustrated in FIG. 1. As illustrated in FIG. 2, the surface of the flat layer 104 distal from the base substrate 101 has poor flatness. It may be readily understood by a person skilled in the art that the poor flatness of the surface of the flat layer 104 distal from the base substrate 101 may cause dimensional deviations of the subsequently prepared metal wire grid layer 105 or structural loss of part of regions. Therefore, the metal wire grid layer 105 presents a low yield, which affects the display effect of the display panel, for example, the mura problem of display stripes may arise on the display panel.

Figure 3:
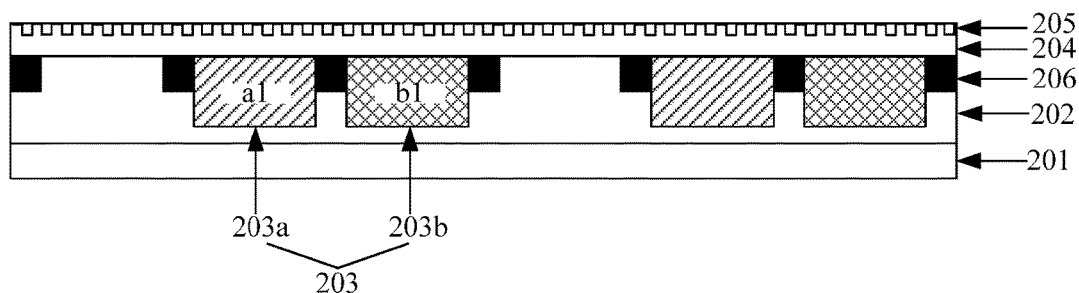
FIG. 3 is a schematic structural diagram of a display substrate according to an embodiment of the present disclosure.

FIG. 3 is a schematic structural diagram of a display substrate 20 according to an embodiment of the present disclosure. As illustrated in FIG. 3, the display substrate 20 includes a carrier substrate 201; an adhesive layer 202, a color resist layer 203, a first flat layer 204 and a metal wire grid layer 205 that are distributed in a direction distal from the carrier substrate 201; and a light shielding pattern 206 disposed between the adhesive layer 202 and the first flat layer 204, wherein a surface of the light shielding pattern 206 proximal to the metal wire grid layer 205 is in the same plane as a surface of the color resist layer 203 proximal to the metal wire grid layer 205.

During manufacturing of the display substrate 20 illustrated in FIG. 3, the base substrate (not illustrated in FIG. 3) and the carrier substrate 201 are provided first; then, the metal wire grid layer 205, the first flat layer 204, the light shielding pattern 206, the color resist layer 203, and the adhesive layer 202 are subsequently formed on one side of the base substrate; next, the carrier substrate 201 is fixedly attached to the surface of the adhesive layer 202 distal from the base substrate; and afterwards, the base substrate is peeled off to obtain the display substrate 20.

In summary, according to the display substrate according to the embodiment of the present disclosure, the metal wire grid layer is formed on the base substrate when the display substrate is manufactured, and the surface of the base substrate has relatively high flatness, thereby contributing to avoiding dimensional deviation of the metal wire grid layer or structural loss of part of regions, increasing the yield of the metal wire grid layer and improving the display effect of the display panel.

It is readily understood that, since the first flat layer 204 is disposed between the metal wire grid layer 205 and the color resist layer 203, the damage to the metal wire grid layer 205 during the preparation process of the color resist layer 203 may be avoided; and since the first flat layer 204 is disposed on one side of the metal wire grid layer 205 distal from the base substrate and a wire grid spacing of the metal wire grid layer 205 is typically at a nanometer level, the metal wire grid layer 205 may cause the flatness of the surface of the first flat layer 204 proximal to the color resist layer 203 to be greater than the flatness of a surface of the first flat layer 204 distal from the color resist layer 203, such that the flatness of the first flat layer 204 meets the flatness requirement, and the flatness of the subsequently prepared color resist layer 203 is ensured, thereby improving the display effect of the display panel.

The adhesive layer 202 may be made of a sealant or an optical adhesive. It may be readily understood by a person skilled in the art that, during manufacturing of the display substrate 20, the adhesive layer 202 may be integrally arranged as an entire layer or partially arranged on one side of the color resist layer 203 distal from the base substrate. When the adhesive layer 202 is arranged as an entire layer on one side of the color resist layer 203 distal from the base substrate, the adhesive layer 202 may achieve a flattening effect to ensure the adhesion reliability between the adhesive layer 202 and the carrier substrate 201.

Optionally, the flatness of the surface of the first flat layer 204 proximal to the color resist layer 203 is greater than the flatness of a surface of the first flat layer 204 distal from the color resist layer 203. The flatness represents the flattening character. In general cases, the greater the flatness, the flatter the surface; and the smaller the flatness, the less flatter the surface. In the embodiment of the present disclosure, the first flat layer 204 may be made of at least one of silicon oxide, silicon nitride, or silicon oxynitride. For example, the first flat layer 204 may be made of silicon oxide, or a mixed material of silicon oxide and silicon oxynitride, or a thermosetting material that includes the following components: propylene glycol methyl ether acetate and dipropylene glycol methyl ether, which is not limited in the embodiment of the present disclosure.

The light shielding pattern 206 may be a black matrix pattern or other patterns having a light shielding function. The light shielding pattern 206 may be made of a black resin, which is not limited in the embodiment of the present disclosure.

Figure 4:
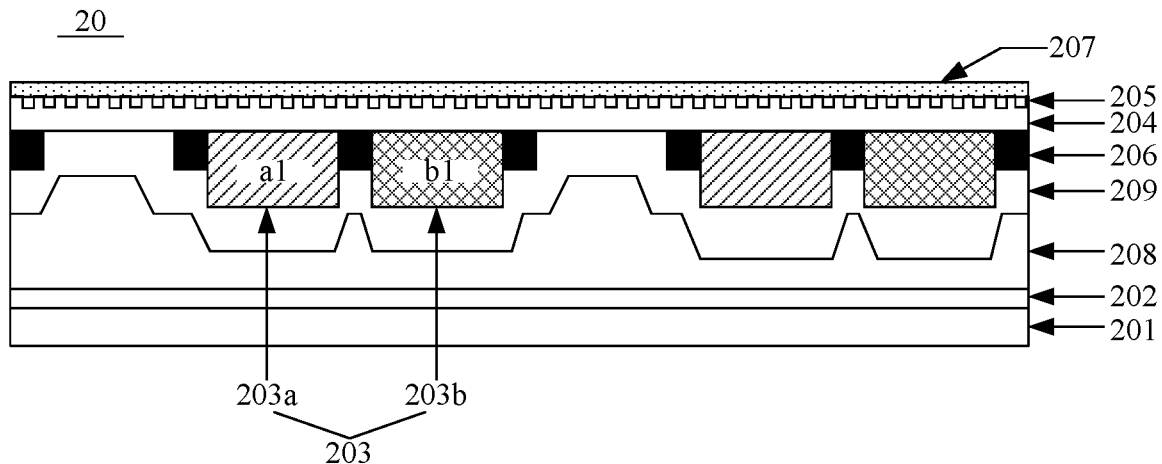
FIG. 4 is a schematic structural diagram of another display substrate according to an embodiment of the present disclosure.

Optionally, FIG. 4 is a schematic structural diagram of another display substrate 20 according to an embodiment of the present disclosure. As illustrated in FIG. 4, on the basis of FIG. 3, the display substrate 20 may further include a protective layer 207 that is disposed on one side of the metal wire grid layer 205 distal from the carrier substrate 201. An adhesion force between the protective layer 207 and the metal wire grid layer 205 is greater than an adhesion force between the protective layer 207 and the base substrate. The thickness of the protective layer 207 may be less than the thickness of the first flat layer 204. For example, the thickness of the first flat layer 204 may be 0.45 micron, and the thickness of the protective layer 207 may be 0.18 micron. The protective layer 207 may be made of at least one of silicon oxide, silicon nitride, or silicon oxynitride. For example, the protective layer 207 may be made of silicon oxide, or a mixed material of silicon oxide and silicon nitride, which is not limited in the embodiment of the present disclosure.

It is readily understood that, during manufacturing of the display substrate 20 as illustrated in FIG. 4, the protective layer 207 is formed on one side of the base substrate first; then, the metal wire grid layer 205, the first flat layer 204, the light shielding pattern 206, the color resist layer 203 and the adhesive layer 202 are sequentially formed on one side of the protective layer 207 distal from the base substrate. In this case, the protective layer 207 may function to protect the metal wire grid layer 205 when the base substrate is peeled off, and therefore, the damage to the metal wire grid layer 205 during the process of peeling off the base substrate is avoided. Since the adhesion force between the protective layer 207 and the metal wire grid layer 205 is greater than the adhesion force between the protective layer 207 and the base substrate, when the base substrate is a glass substrate, the protective layer 207 can improve the adhesion of the metal wire grid layer 205 and increase the preparation yield of the metal wire grid layer 205.

Optionally, still referring to FIG. 4, the display substrate 20 further includes a second flat layer 208 and a third flat layer 209. The second flat layer 208 is disposed between the adhesive layer 202 and the color resist layer 203. The third flat layer 209 is disposed between the second flat layer 208 and the color resist layer 203. The flatness of a surface of the second flat layer 208 proximal to the adhesive layer 202 is greater than the flatness of a surface of the third flat layer 209 distal from the adhesive layer 202. The second flat layer 208 may be made of an ultraviolet curable material that includes the following components: propylene glycol methyl ether acetate, dipropyleneglycol methyl ether and a photoinitiator. Optionally, the thickness of the second flat layer 208 may be 1.8 microns.

It is readily understood that, since the second flat layer 208 and the third flat layer 209 are provided between the color resist layer 203 and the adhesive layer 202, during manufacturing f the display substrate 20 is manufactured, the third flat layer 209 may perform preliminary planarization on a surface of the color resist layer 203 distal from the base substrate. On the basis of the third flat layer 209, the second flat layer 208 may further planarize the surface of the color resist layer 203 distal from the base substrate, such that the flatness of a surface of the second flat layer 208 proximal to the adhesive layer 202 is greater than the flatness of a surface of the third flat layer 209 distal from the adhesive layer 202. Therefore, the flatness of the surface of the subsequently prepared adhesive layer 202 is ensured, and the adhesion reliability between the carrier substrate and the adhesive layer 202 is further improved.

Optionally, in the embodiment of the present disclosure, the color resist layer includes at least one of a red color resist or a green color resist. The display substrate 20 may be a color film substrate. Exemplarily, as illustrated in FIG. 3 and FIG. 4, the color resist layer 203 may include a red color resist 203a and a green color resist 203b, wherein the red color resist 203a may include a red quantum dot layer a1, and the green color resist 203b may include a green quantum dot layer b1; and the display substrate 20 is a quantum dot color film substrate. It is readily understood by a person skilled in the art that the red color resist 203a is disposed in a red pixel region, and the red quantum dot layer a1 is made of a quantum dot material capable of emitting red light; the green color resist 203b is disposed in a green pixel region, and the green quantum dot layer b1 is made of a quantum dot material capable of emitting green light. Since the quantum dot material may generally be mixed in an adhesive material to form a quantum dot layer, in some scenarios, the quantum dot layer may also be referred to as a quantum dot adhesive layer.

Optionally, one side of the carrier substrate distal from the metal wire grid layer may be a light exiting side of the display substrate. The red quantum dot layer is excited by non-red light to emit light. The red color resist may further include a red filter layer which is disposed on one side of the red quantum dot layer proximal to the carrier substrate. The green quantum dot layer is excited by non-green light to emit light. The green color resist may further include a green filter layer which is disposed on one side of the green quantum dot layer proximal to the carrier substrate.

Optionally, the red color resist includes a red filter layer, wherein an orthographic projection of the red filter layer on the red quantum dot layer covers the red quantum dot layer; and/or, the green color resist includes a green filter layer, wherein an orthographic projection of the green filter layer on the green quantum dot layer covers the green quantum dot layer.

It is readily understood by a person skilled in the art that, since an excitation light for the red quantum dot layer is non-red light, the red filter layer is formed on one side of the red quantum dot layer proximal to the carrier substrate. In the case of not affecting the normal light emission of the red quantum dot layer, when ambient light enters the display substrate, the red filter layer can filter the ambient light, such that the light reaching the red quantum dot layer is red light, and therefore, the ambient light cannot excite the red quantum dot layer to emit light. Since an excitation light for the green quantum dot layer is non-green light, a green filter layer is formed on one side of the green quantum dot layer proximal to the carrier substrate. In the case of not affecting the normal light emission of the green quantum dot layer, when ambient light enters the display substrate, the green filter layer can filter the ambient light, such that the light reaching the green quantum dot layer is green light, and therefore, the ambient light cannot excite the green quantum dot layer to emit light. It is readily understood that the red filter layer is formed on one side of the red quantum dot layer proximal to the carrier substrate, and the green filter layer is formed on one side of the green quantum dot layer proximal to the carrier substrate, such that the influence of ambient light on a display screen of the display panel may be avoided. In an embodiment of the present disclosure, both the excitation light for the red quantum dot layer and the excitation light for the green quantum dot layer may be blue light.

Figure 5:
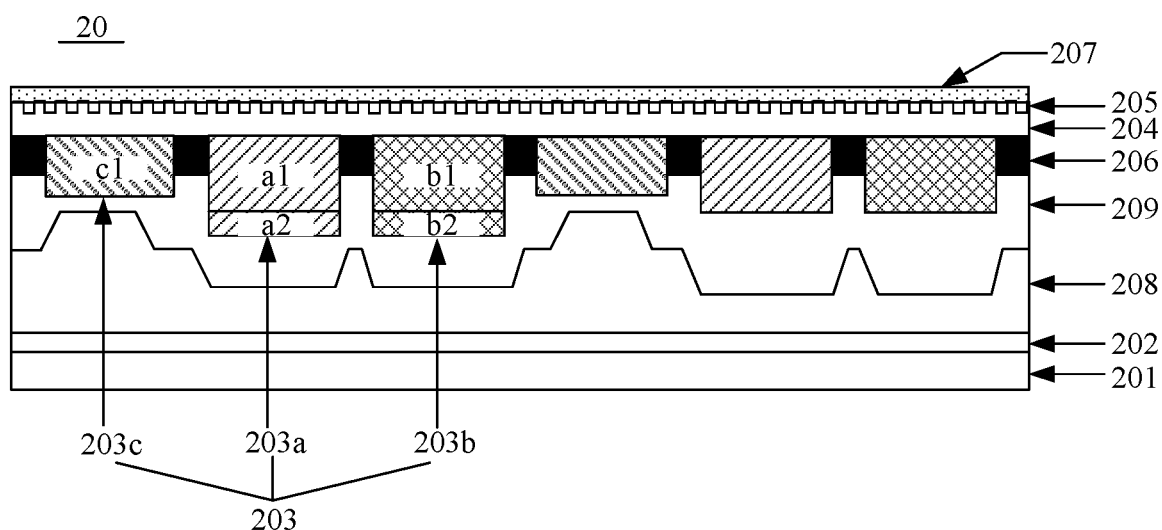
FIG. 5. is a schematic structural diagram of still another display substrate according to an embodiment of the present disclosure.

Exemplarily, FIG. 5 is a schematic structural diagram of still another display substrate 20 according to an embodiment of the present disclosure. As illustrated in FIG. 5, the color resist layer 203 includes a red color resist 203a, a green color resist 203b and a blue color resist 203c. The red color resist 203a includes a red quantum dot layer a1, and a red filter layer a2 that is disposed on one side of the red quantum dot layer a1 proximal to the carrier substrate 201. An orthographic projection of the red filter layer a2 on the red quantum dot layer a1 covers the red quantum dot layer a1. The green color resist 203b includes a green quantum dot layer b1, and a green filter layer b2 that is disposed on one side of the green quantum dot layer b1 proximal to the carrier substrate 201. An orthographic projection of the green filter layer b2 on the green quantum dot layer b1 covers the green filter layer b2. The blue color resist 203c includes a blue filter layer c1. Of course, the blue color resist 203c may further include a blue filter layer, which will not be limited in the embodiment of the present disclosure.

It is readily understood by a person skilled in the art that the blue color resist is disposed in a blue pixel region. The blue filter layer can improve the color gamut of blue light in the blue pixel region, such that the color gamut of the blue light matches the color gamut of red light emitted by the red quantum dot layer, and the color gamut of green light emitted by the green quantum dot layer, thereby improving the overall display color gamut of the display panel.

Referring to FIGS. 1, 3 and 5, compared with the black matrix 102 in the color film substrate 10 illustrated in FIG. 1, the light shielding pattern 206 in the display substrate 20 according to the embodiment of the present disclosure is closer to the metal wire grid layer. When one side of the carrier substrate 201 distal from the metal wire grid layer is a light exiting side of the display substrate 20, the light shielding pattern 206 in the embodiment of the present disclosure is closer to a backlight module. When light provided by the backlight module is incident from one side of the metal wire grid layer distal from the light shielding pattern 206, the closer the light shielding pattern 206 to the metal wire grid layer, the shorter a transmissible distance of the incident light for illuminating a target pixel between the metal wire grid layer and the light shielding pattern 206, and accordingly, the less incident light having a large viewing angle (referring to incident light having an incident angle greater than a specified angle) in the incident light, that may be transmitted to a pixel region adjacent to the target pixel, thereby contributing to reducing the crosscolor between adjacent pixels and improving the display effect. Compared with the color film substrate 10 illustrated in FIG. 1, the display substrate 20 according to the embodiment of the present disclosure can reduce the crosscolor between adjacent pixels by 30% (in percentage).

In the embodiment of the present disclosure, during manufacturing of the display substrate 20 illustrated in FIG. 4 or 5, the base substrate (not illustrated in FIG. 4 and FIG. 5) and the carrier substrate 201 are provided first; then, the protective layer 207, the metal wire grid layer 205, the first flat layer 204, the light shielding pattern 206, the color resist layer 203, the third flat layer 209, the second flat layer 208 and the adhesive layer 202 are sequentially formed on one side of the base substrate; next, the carrier substrate 201 is fixedly attached to a surface of the adhesive layer 202 distal from the base substrate; subsequently, the base substrate is peeled off to obtain the display substrate 20.

It is readily understood by a person skilled in the art that the structure of the display substrate described in the embodiment of the present disclosure is merely exemplary. The display substrate may include more or less structures than the display substrate described in the present disclosure, which will not be described herein again.

In summary, according to the display substrate according to the embodiment of the present disclosure, during manufacturing of the display substrate, the metal wire grid layer is formed on one side of the protective layer distal from the base substrate, and the surface of the protective layer has higher flatness, which contributes to avoiding the dimensional deviation of the metal wire grid layer and structural loss of part of regions, ensuring the integrity and structural consistency of the metal wire grid layer, increasing the yield of the metal wire grid layer, and improving the display effect of the display panel, for example, improving the mura problem of display stripes. In addition, when one side of the carrier substrate distal from the protective layer is a light exiting side of the display substrate, the distance between the light shielding pattern in the display substrate and the backlight module in the display device is reduced, and thus the cross color between adjacent pixels may be reduced.

Based on the same inventive concept, an embodiment of the present disclosure provides a display panel including the display substrate 20 illustrated in any of FIGS. 3 to 5.

Optionally, the display substrate 20 may be a color film substrate. The display panel may further include an array substrate facing the display substrate 20, and a liquid crystal layer disposed between the array substrate and the display substrate 20.

It is readily understood that the display panel according to the embodiment of the present disclosure may be a liquid crystal display panel.

Figure 6:
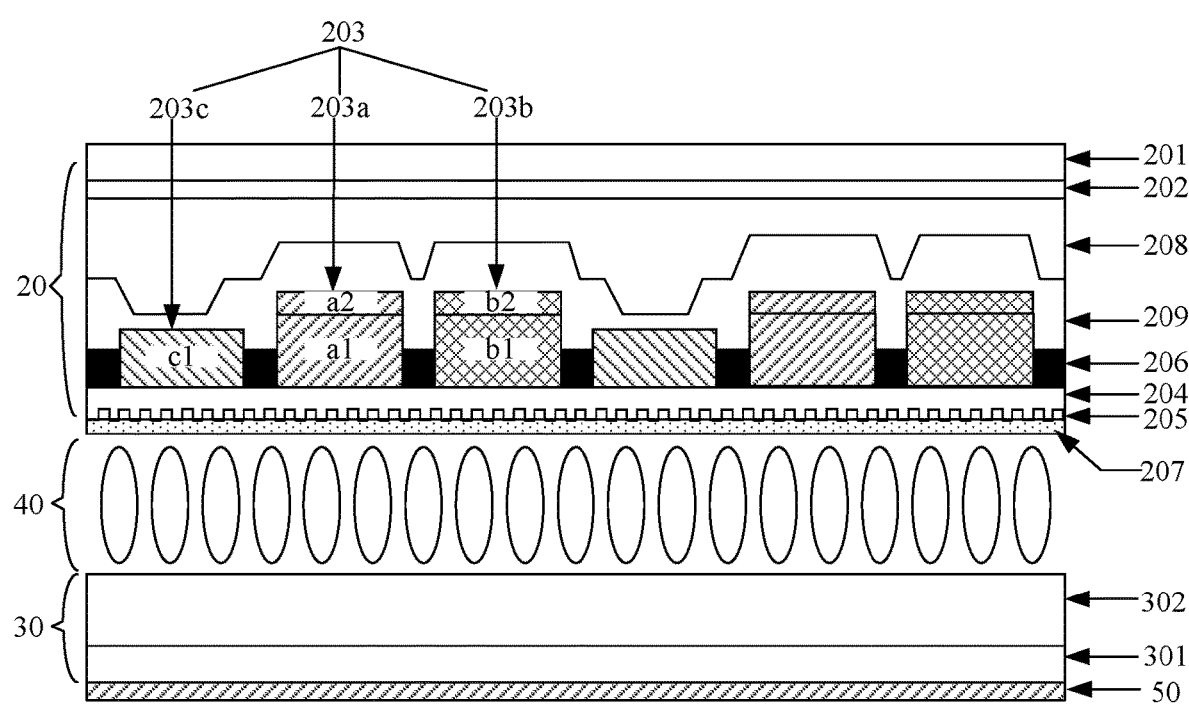
FIG. 6. is a schematic structural diagram of a display panel according to an embodiment of the present disclosure.

Exemplarily, FIG. 6 is a schematic structural diagram of a display panel according to an embodiment of the present disclosure. As illustrated in FIG. 6, the display panel includes an array substrate 30, a display substrate 20, and a liquid crystal layer 40 disposed between the array substrate 30 and the display substrate 20. The display substrate 20 is a color film substrate.

Referring to FIG. 6, the array substrate 30 includes a base substrate 301, and a thin film transistor 302 disposed on the base substrate 301. FIG. 6 illustrates the display substrate 20 by taking the display substrate illustrated in FIG. 5 as an example. As illustrated in FIG. 6, the display substrate 20 includes a carrier substrate 201, and an adhesive layer 202, a second flat layer 208, a third flat layer 209, a color resist layer 203, a light shielding pattern 206, a first flat layer 204, a metal wire grid layer 205, and a protective layer 207 that are distributed in a direction distal from the carrier substrate 201.

Optionally, referring to FIG. 6, the display panel further includes a lower polarizer 50 that is attached to a surface of the base substrate 301 distal from the display substrate 20. It is readily understood that FIG. 6 is merely exemplary, and a metal wire grid layer may also be formed as a lower polarizer on one side of the base substrate 301 proximal to the display substrate 20, which will not be defined in the embodiment of the present disclosure.

In summary, the display panel according to the embodiment of the present disclosure includes a display substrate. During manufacturing of the display substrate, the metal wire grid layer is formed on one side of the protective layer distal from the base substrate, and the surface of the protective layer has higher flatness, which contributes to avoiding the dimensional deviation of the metal wire grid layer and structural loss of part of regions, increasing the yield of the metal wire grid layer and improving the display effect of the display panel. In addition, when the side of the carrier substrate distal from the protective layer is the light exiting side of the display panel, a distance between the light shielding pattern in the display substrate and the backlight module in the display device is reduced, and therefore, the cross color between adjacent pixels may be reduced.

Based on the same inventive concept, an embodiment of the present disclosure provides a display device. The display device includes a backlight module, and a display panel as illustrated in FIG. 6.

Optionally, the backlight module is configured to supply blue light to the display panel, and a light emitting unit in the backlight module may be a blue light emitting diode or a micro blue light chip.

Optionally, the backlight module may be disposed on one side of the array substrate distal from the display substrate. Compared with the traditional color film substrate, the light shielding pattern in the display substrate according to the embodiment of the present disclosure is closer to the backlight module. When light provided by the backlight module is incident from one side of the metal wire grid layer distal from the light shielding pattern, the closer the light shielding pattern distal from the metal wire grid layer, the shorter a transmissible distance of the incident light for illuminating a target pixel between the metal wire grid layer and the light shielding pattern, and accordingly, the less incident light having a large viewing angle in the incident light, that may be transmitted to a pixel region adjacent to the target pixel, which contributes to reducing crosscolor between adjacent pixels.

Optionally, the display device according to the embodiment of the present disclosure may be any product or component having a display function, such as a liquid crystal display, an electronic paper, a mobile phone, a tablet computer, a television, a display, a notebook computer, a digital photo frame, a navigator or a smart wearable device.

In summary, the display device according to the embodiment of the present disclosure includes a display substrate. During manufacturing of the display substrate, the metal wire grid layer is formed on one side of the protective layer distal from the base substrate, and the surface of the protective layer has higher flatness, which contributes to avoiding the dimensional deviation of the metal wire grid layer and structural loss of part of regions, increasing the yield of the metal wire grid layer and improving the display effect of the display panel. In addition, when the side of the carrier substrate distal from the protective layer is the light exiting side of the display panel, a distance between the light shielding pattern in the display substrate and the backlight module in the display device is reduced, and therefore, the cross color between adjacent pixels may be reduced.

Figure 7:
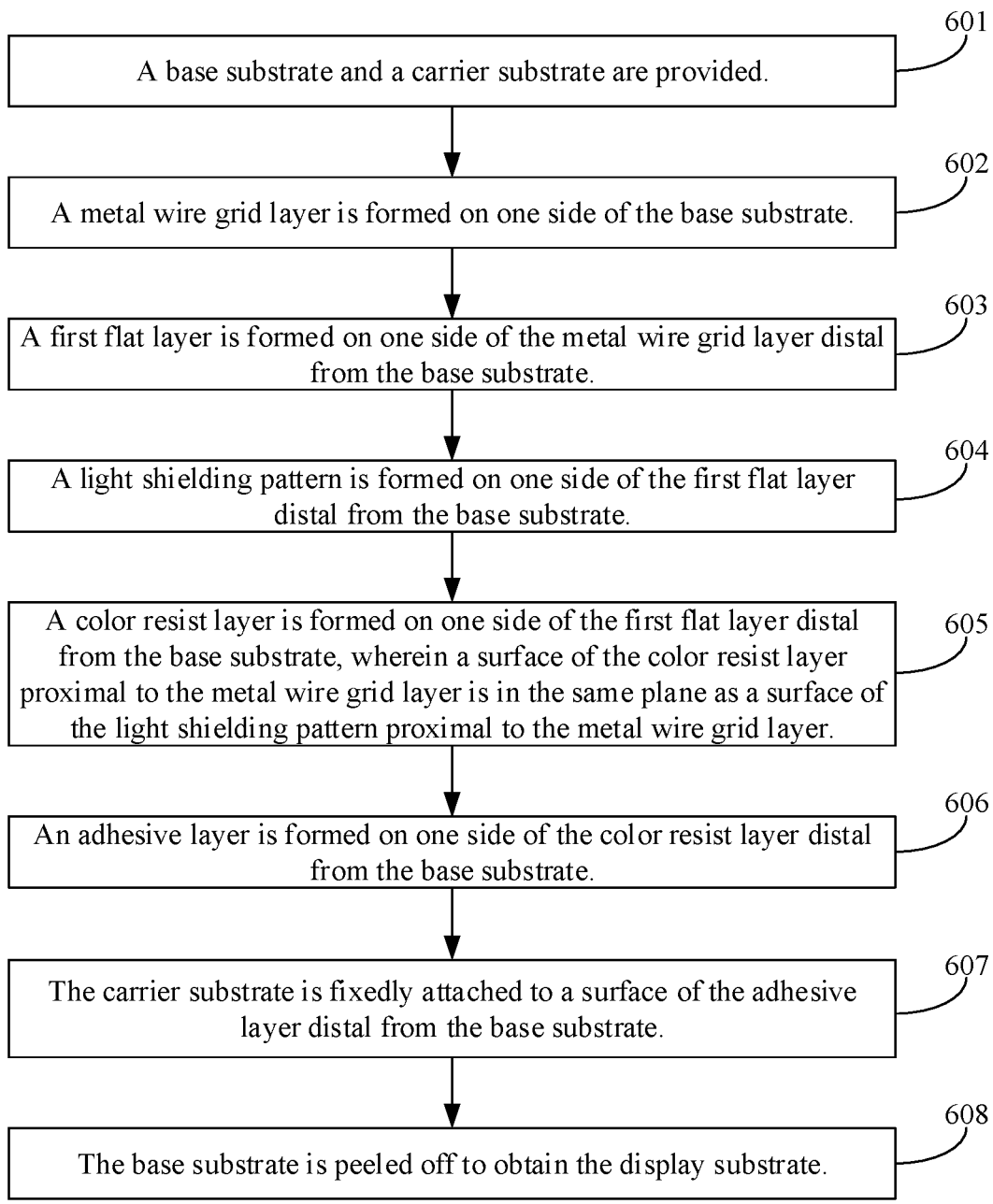
FIG. 7 is a flowchart of a method for manufacturing a display substrate according to an embodiment of the present disclosure.

FIG. 7 is a flowchart of a method for manufacturing a display substrate according to an embodiment of the present disclosure. The method may be employed to manufacture the display substrate 20 illustrated in any of FIGS. 3 to 5. As illustrated in FIG. 7, the method may include the following steps.

In step 601, a base substrate and a carrier substrate are provided.

In step 602, a metal wire grid layer is formed on one side of the base substrate.

In step 603, a first flat layer is formed on one side of the metal wire grid layer distal from the base substrate.

In step 604, a light shielding pattern is formed on one side of the first flat layer distal from the base substrate.

In step 605, a color resist layer is formed on one side of the first flat layer distal from the base substrate, wherein a surface of the color resist layer proximal to the metal wire grid layer is in the same plane as a surface of the light shielding pattern proximal to the metal wire grid layer.

Optionally, the color resist layer includes at least one of a red color resist, a green color resist and a blue color resist, and the display substrate may be a color film substrate. Exemplarily, referring to FIG. 3, the color resist layer 203 includes a red color resist 203a and a green color resist 203b. The red color resist 203a may include a red quantum dot layer a1, the green color resist 203b may include a green quantum dot layer b1, and the display substrate may be a quantum dot color film substrate.

In step 606, an adhesive layer is formed on one side of the color resist layer distal from the base substrate.

In step 607, the carrier substrate is fixedly attached to a surface of the adhesive layer distal from the base substrate.

In step 608, the base substrate is peeled off to obtain the display substrate.

In summary, according to the method for manufacturing the display substrate according to the embodiment of the present disclosure, the display substrate is obtained by sequentially forming the metal wire grid layer, the first flat layer, the light shielding pattern, the color resist layer and the adhesive layer on the base substrate, fixedly attaching the carrier substrate to a surface of the adhesive layer distal from the base substrate, and then peeling off the base substrate. The metal wire grid layer is formed on the base substrate, and the surface of the base substrate has higher flatness, which contributes to avoiding the dimensional deviation of the metal wire grid layer and structural loss of part of regions, increasing the yield of the metal wire grid layer and improving the display effect of the display panel.

Figure 8:
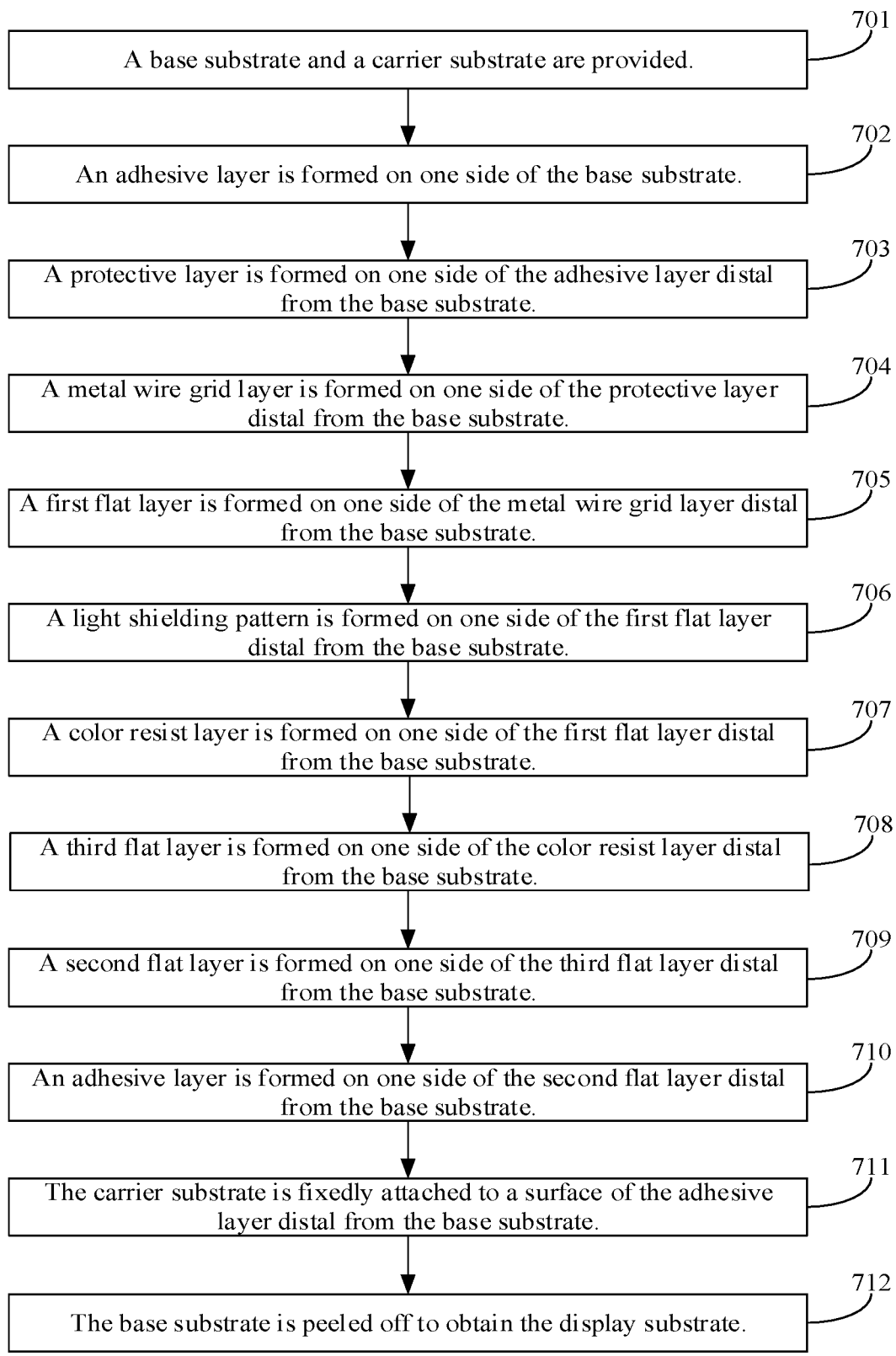
FIG. 8 is a flowchart of another method for manufacturing a display substrate according to an embodiment of the present disclosure.

FIG. 8 is a flowchart of another method for manufacturing a display substrate according to an embodiment of the present disclosure. The method may be employed to manufacture the display substrate 20 illustrated in any of FIGS. 3 to 5. This embodiment is described by taking the display substrate 20 illustrated in FIG. 5 as an example. The method for manufacturing the display substrate 20 illustrated in FIGS. 3 and 4 may refer to this embodiment. As illustrated in FIG. 8, the method may include the following steps.

In step 701, a base substrate and a carrier substrate are provided.

Optionally, each of the base substrate and the carrier substrate may be made of a material such as glass, silicon wafer, quartz or plastic. The material of the base substrate and the carrier substrate is not limited in the embodiment of the present disclosure, but the surface of the base substrate needs to be flat.

In step 702, an adhesive layer is formed on one side of the base substrate.

Figure 9:
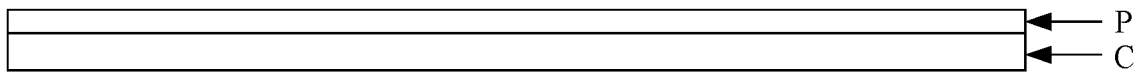
FIG. 9 is a schematic diagram after an adhesive layer is formed on one side of a base substrate according to an embodiment of the present disclosure.

FIG. 9 is a schematic diagram after an adhesive layer P is formed on one side of the base substrate C according to an embodiment of the present disclosure, where the base substrate C may be coated with a layer of optical adhesive as the adhesive layer P.

In step 703, a protective layer is formed on one side of the adhesive layer distal from the base substrate.

Figure 10:
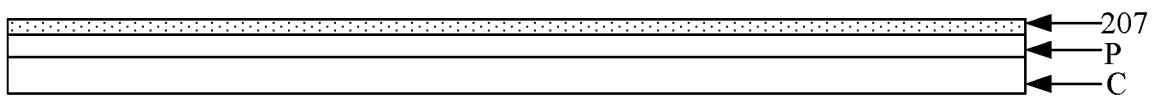
FIG. 10 is a schematic diagram after a protective layer is formed on one side of the adhesive layer distal from the base substrate according to an embodiment of the present disclosure.

FIG. 10 is a schematic diagram after a protective layer 207 is formed on one side of the adhesive layer P distal from the base substrate C according to an embodiment of the present disclosure, where the protective layer 207 may be formed on one side of the adhesive layer P distal from the base substrate C by applying a protective material or attaching a protective film layer. The protective layer 207 may be made of at least one of silicon oxide, silicon nitride, or silicon oxynitride.

In step 704, a metal wire grid layer is formed on one side of the protective layer distal from the base substrate.

Figure 11:
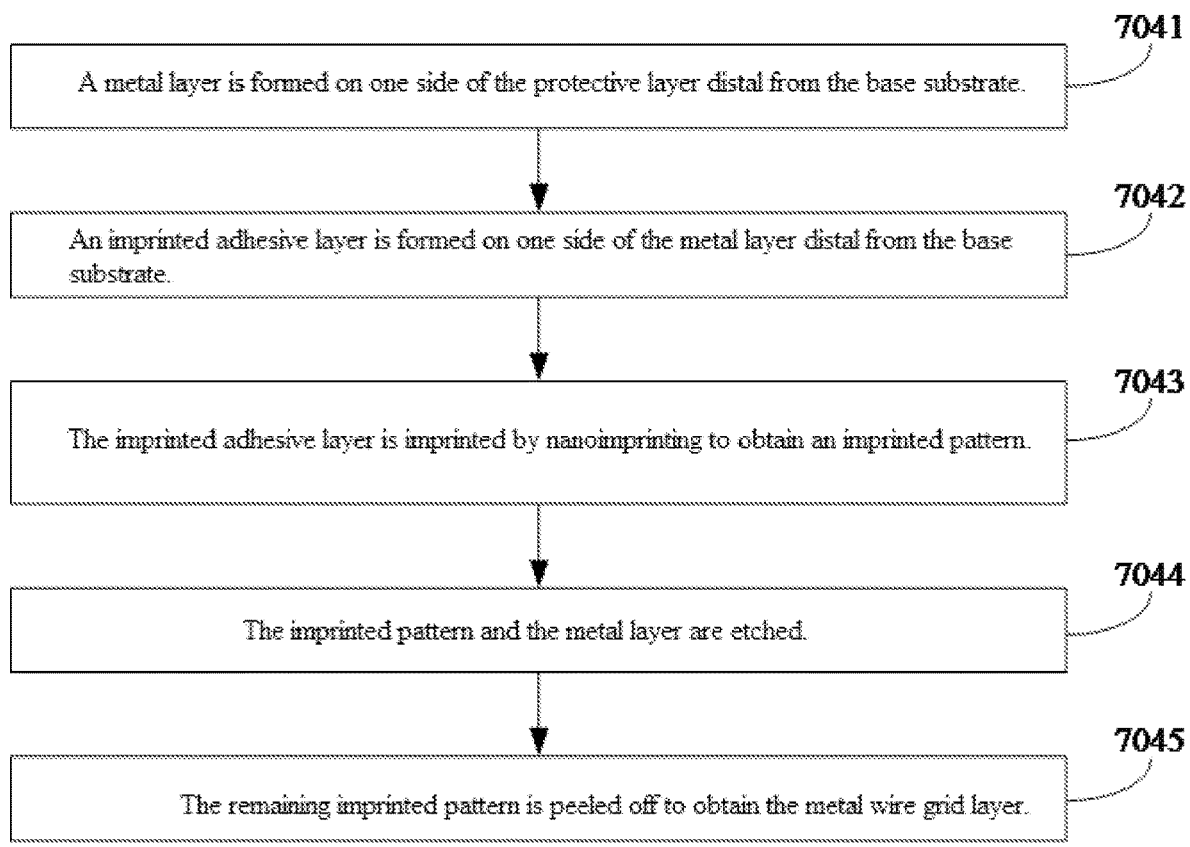
FIG. 11 is a flowchart of a method for forming a metal wire grid layer on one side of the protective layer distal from the base substrate according to an embodiment of the present disclosure.

Optionally, FIG. 11 is a flowchart of a method for forming a metal wire grid layer on one side of the protective layer distal from the base substrate according to an embodiment of the present disclosure. As illustrated in FIG. 11, the method may include the following steps.

In sub-step 7041, a metal layer is formed on one side of the protective layer distal from the base substrate.

Figure 12:
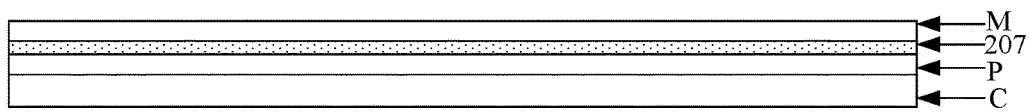
FIG. 12 is a schematic diagram after a metal layer is formed on one side of the protective layer distal from the base substrate according to an embodiment of the present disclosure.

FIG. 12 is a schematic diagram after a metal layer M is formed on one side of the protective layer 207 distal from the base substrate C according to an embodiment of the present disclosure, where the metal layer may be formed on one side of the protective layer 207 distal from the base substrate C by any one of evaporation, sputtering, or deposition. The metal layer may be made of metal aluminum or other metal materials.

In sub-step 7042, an imprinted adhesive layer is formed on one side of the metal layer distal from the base substrate.

Figure 13:
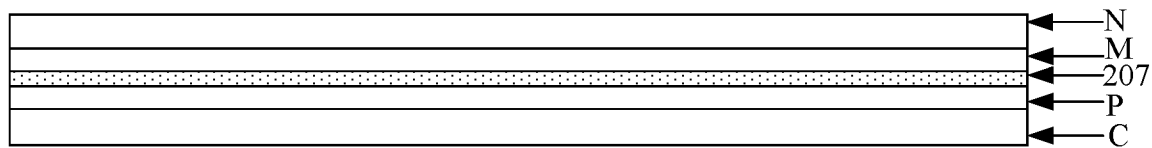
FIG. 13 is a schematic diagram after an imprinted adhesive layer is formed on one side of the metal layer distal from the base substrate according to an embodiment of the present disclosure.

FIG. 13 is a schematic diagram after an imprinted adhesive layer N is formed on one side of the metal layer M distal from the base substrate C according to an embodiment of the present disclosure, where a surface of the metal layer M distal from the base substrate C is coated with a layer of imprinted adhesive as the imprinted adhesive layer N.

In sub-step 7043, the imprinted adhesive layer is imprinted by nanoimprinting to obtain an imprinted pattern.

Figure 14:
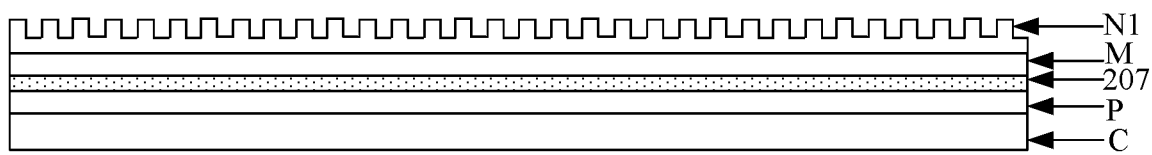
FIG. 14 is a schematic diagram after an imprinted pattern is formed on one side of the metal layer distal from the base substrate according to an embodiment of the present disclosure.

FIG. 14 is a schematic diagram after an imprinted pattern N1 is formed on one side of the metal layer M distal from the base substrate C according to an embodiment of the present disclosure, where an imprinted adhesive layer N is imprinted by nanoimprinting to obtain the imprinted pattern N1. Optionally, the imprinted adhesive layer M is imprinted from one side of the imprinted adhesive layer N distal from the metal layer M by using an imprinting template to obtain the imprinted pattern N1.

In sub-step 7044, the imprinted pattern and the metal layer are etched.

The imprinted pattern N1 and the metal layer M may be entirely etched from one side of the imprinted pattern N1 distal from the base substrate C. Optionally, the imprinted pattern N1 is etched by dry etching, and the metal layer M is etched by wet etching.

In sub-step 7045, the remaining imprinted pattern is peeled off to obtain the metal wire grid layer.

Figure 15:
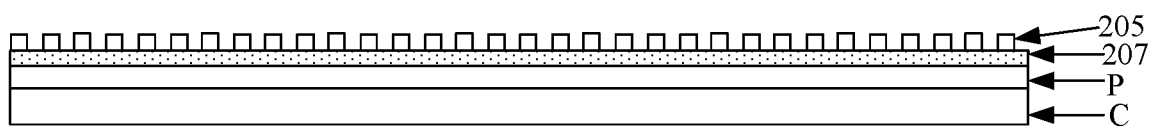
FIG. 15 is a schematic diagram after the metal wire grid layer is formed on one side of the protective layer distal from the base substrate according to an embodiment of the present disclosure.

FIG. 15 is a schematic diagram after a metal wire grid layer 205 is formed on one side of the protective layer 207 distal from the base substrate C according to an embodiment of the present disclosure. Optionally, the residual imprinted pattern may be removed by mechanical peeling to obtain the metal wire grid layer 205.

It is readily understood that, as described in the embodiment of the present disclosure, the protective layer is formed on the base substrate, and the metal wire grid layer is formed on one side of the protective layer distal from the base substrate. Therefore, during subsequently peeling of the base substrate, the protective layer may function to protect the metal wire grid layer. In addition, when the base substrate is a glass substrate, the protective layer may function to improve the adhesion of the metal wire grid layer and increase the yield of the metal wire grid layer.

In step 705, a first flat layer is formed on one side of the metal wire grid layer distal from the base substrate.

Figure 16:
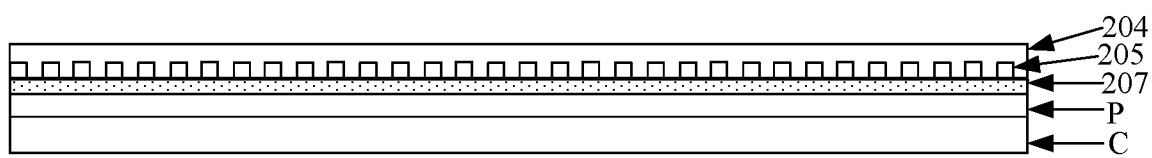
FIG. 16 is a schematic diagram after a first flat layer is formed on one side of the metal wire grid layer distal from the base substrate according to an embodiment of the present disclosure.

FIG. 16 is a schematic diagram after a first flat layer 204 is formed on one side of the metal wire grid layer 205 distal from the base substrate C according to an embodiment of the present disclosure, where the flatness of a surface of the first flat layer 204 distal from the metal wire grid layer 205 is greater than the flatness of a surface of the first flat layer 204 proximal to the metal wire grid layer 205. The thickness of the first flat layer 204 may be greater than the thickness of the protective layer 207. For example, the thickness of the first flat layer 204 may be 0.45 micron, and the thickness of the protective layer 207 may be 0.18 micron. The first flat layer 204 may be made of at least one of silicon oxide, silicon nitride, and silicon oxynitride, or a thermosetting material that includes the following components: propylene glycol methyl ether acetate and dipropylene glycol methyl ether. Exemplarily, the first flat layer 204 is obtained by depositing silicon oxide on one side of the metal wire grid layer 205 distal from the base substrate C, and curing the deposited silicon oxide.

It is readily understood that the first flat layer is formed on one side of the metal wire grid layer distal from the base substrate. Therefore, the first flat layer may function to protect the metal wire grid layer, thereby avoiding the damage to the metal wire grid layer during the process of subsequently preparing the light shielding pattern and the color resist layer. The metal wire grid layer has a wire grid spacing of a nanometer level, and the first flat layer is formed on one side of the metal wire grid layer distal from the base substrate, such that the flatness of the first flat layer during the preparation process of the color resist layer may be ensured, and the display effect of the display panel may be improved.

In step 706, a light shielding pattern is formed on one side of the first flat layer distal from the base substrate.

Figure 17:
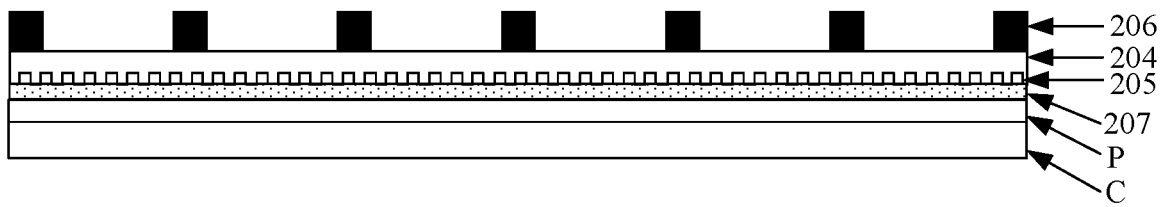
FIG. 17 is a schematic diagram after a light shielding pattern is formed on one side of the first flat layer distal from the base substrate according to an embodiment of the present disclosure.

FIG. 17 is a schematic diagram after a light shielding pattern 206 is formed on one side of the first flat layer 204 distal from the base substrate C according to an embodiment of the present disclosure, where the light shielding pattern 206 may be a black matrix pattern or other patterns having a light shielding function. Optionally, a layer of light shielding material is disposed on one side of the first flat layer 204 distal from the base substrate C by deposition, and the light shielding material layer is processed by a one-time patterning process to obtain the light shielding pattern 206. The one-time patterning processes may include: photoresist coating, exposure, development, etching, and photoresist peeling.

In step 707, a color resist layer is formed on one side of the first flat layer distal from the base substrate.

Figure 18:
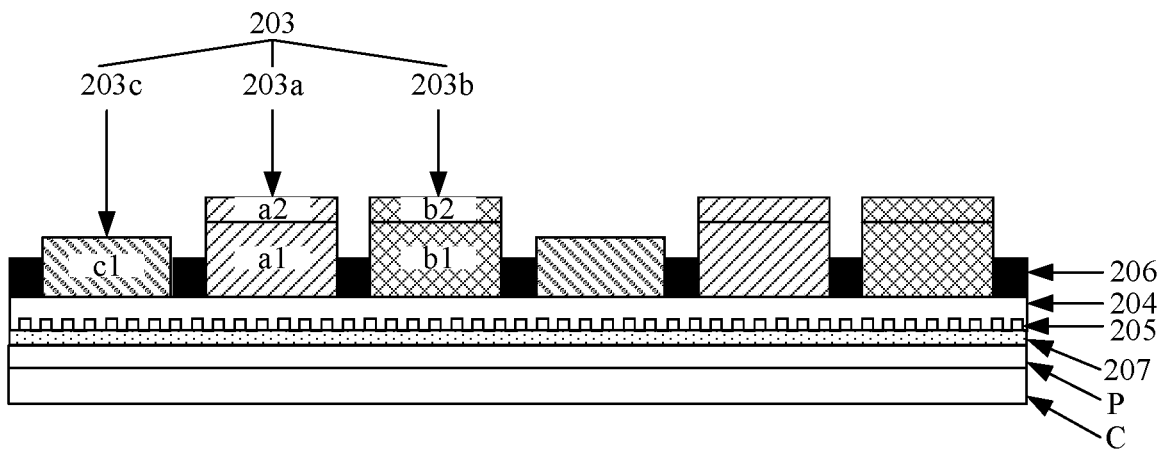
FIG. 18 is schematic diagram after a color resist layer is formed on one side of the first flat layer distal from the base substrate according to an embodiment of the present disclosure.

FIG. 18 is a schematic diagram after a color resist layer 203 is formed on one side, where the light shielding pattern 206 is formed, of the first flat layer 204 distal from the base substrate C according to an embodiment of the present disclosure. As illustrated in FIG. 18, a surface of the color resist layer 203 proximal to the metal grid layer 205 is in the same plane as a surface of the light shielding pattern 206 proximal to the metal wire grid layer 205. The color resist layer 203 may include a red color resist 203a, a green color resist 203b, and a blue color resist 203c. The red color resist 203a may include a red quantum dot layer a1 and a red filter layer a2 that are superimposed. The green color resist 203b may include a green quantum dot layer a1 and a red filter layer a2 that are superimposed. The blue color resist 203c may include a blue filter layer c1.

Optionally, the step of forming the color resist layer 203 on one side of the first flat layer 204 distal from the base substrate C may include: forming a quantum dot color film layer on one side of the first flat layer 204 distal from the base substrate C, the quantum dot color film layer including a red quantum dot layer a1 and a green quantum dot layer b1; and forming a filter color film layer on the base substrate C on which the quantum dot color film layer is formed, the filter color film layer including a red filter layer a2, a green filter layer b2, and a blue filter layer c1. The red filter layer a2 and the red quantum dot layer a1 are superimposed to form the red color resist 203a, and an orthographic projection of the red filter layer a2 on the red quantum dot layer a1 covers the red quantum dot layer a1. The green filter layer b2 and the green quantum dot layer b1 are superimposed to form the green color resist 203b, and an orthographic projection of the green filter layer b2 on the green quantum dot layer b1 covers the green quantum dot layer b1.

In step 708, a third flat layer is formed on one side of the color resist layer distal from the base substrate.

Figure 19:
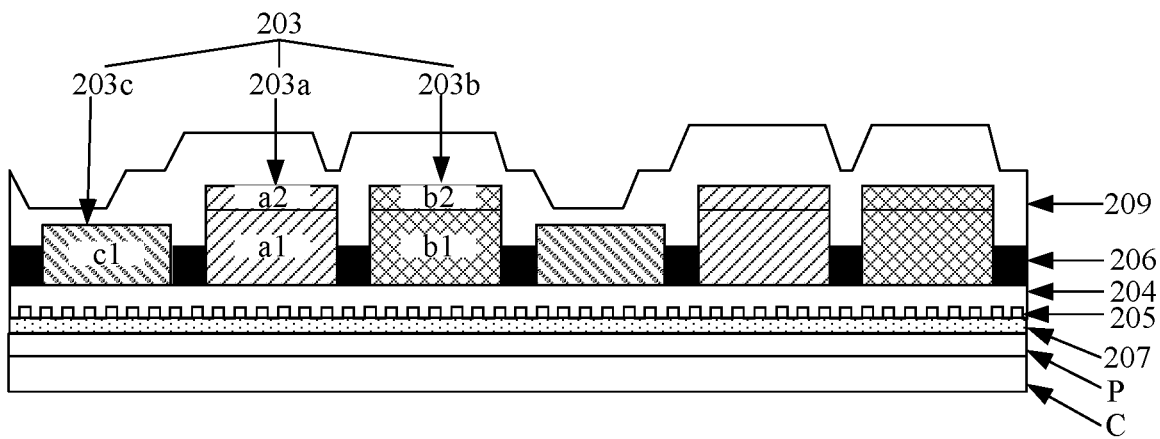
FIG. 19 is a schematic diagram after a third flat layer is formed on one side of the color resist layer distal from the base substrate according to an embodiment of the present disclosure.

FIG. 19 is a schematic diagram after a third flat layer 209 is formed on one side of the color resist layer 203 distal from the base substrate C according to an embodiment of the present disclosure, where the third flat layer 209 may be made of organic resin. Optionally, one side of the color resist layer 203 distal from the base substrate C is coated with a layer of organic resin as the third flat layer 209.

In step 709, a second flat layer is formed on one side of the third flat layer distal from the base substrate.

Figure 20:
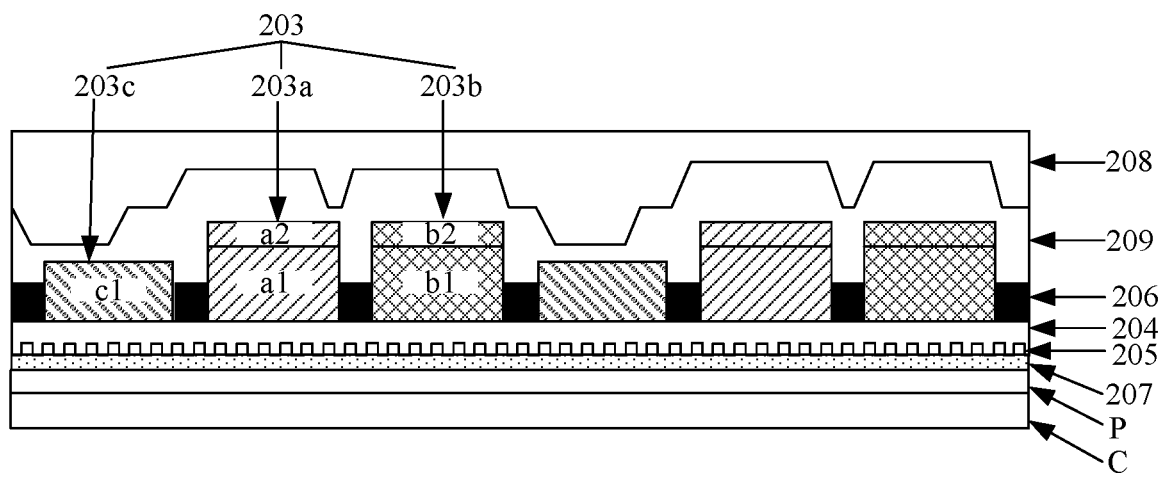
FIG. 20 is a schematic diagram after a second flat layer is formed on one side of the third flat layer distal from the base substrate according to an embodiment of the present disclosure.

FIG. 20 is a schematic diagram after a second flat layer 208 is formed on one side of the third flat layer 209 distal from the base substrate C according to an embodiment of the present disclosure, where the flatness of a surface of the second flat layer 208 distal from the color resist layer 203 is greater than the flatness of a surface of the third flat layer 209 proximal to the color resist layer 203, and the thickness of the second flat layer 208 may be 1.8 microns. The second flat layer 208 may be made of an ultraviolet curable material that includes the following components: propylene glycol methyl ether acetate, dipropylene glycol methyl ether, and a photoinitiator. Exemplarily, the second flat layer 208 is formed on one side of the third flat layer 209 distal from the base substrate C by imprinting.

It is readily understood that the third flat layer and the second flat layer are formed on one side of the color resist layer distal from the base substrate, and the third flat layer may perform prepriplanary planarization on a surface of the color resist layer distal from the base substrate. On the basis of the third flat layer, the second flat layer 208 may further planarize the surface of the color resist layer distal from the base substrate, such that the flatness of the surface of the second flat layer distal from the color resist layer is greater than the flatness of a surface of the third flat layer proximal to the color resist layer. Therefore, the flatness of the surface of the subsequently prepared adhesive layer is improved.

In step 710, an adhesive layer is formed on one side of the second flat layer distal from the base substrate.

Figure 21:
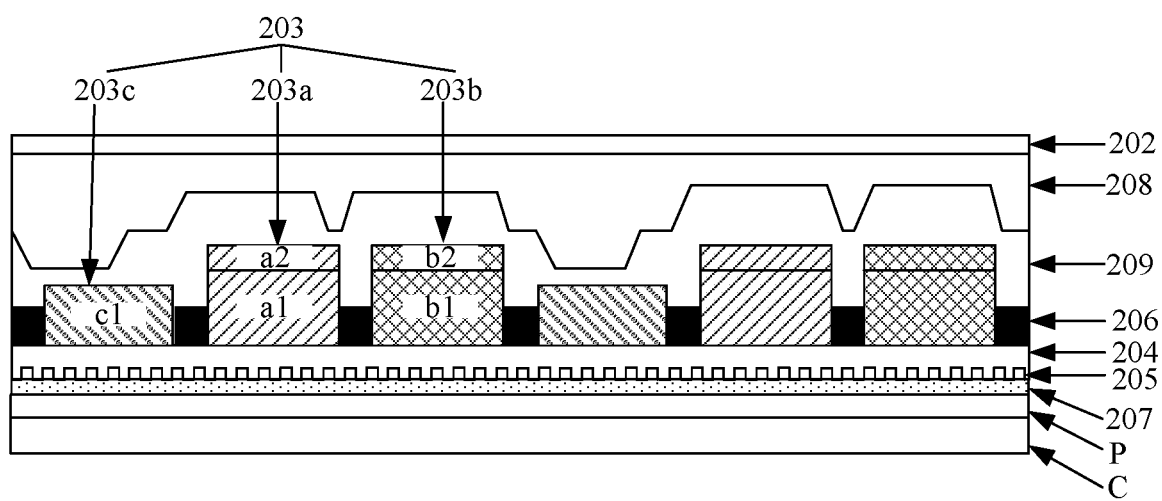
FIG. 21 is a schematic diagram after an adhesive layer is formed on one side of the second flat layer distal from the base substrate according to an embodiment of the present disclosure.

FIG. 21 is a schematic diagram after an adhesive layer 202 is formed on one side of the second flat layer 208 distal from the base substrate C according to an embodiment of the present disclosure. Optionally, the surface of the second flat layer 208 distal from the base substrate C is coated with a layer of adhesive as the adhesive layer 202.

The adhesive layer may be made of a seal. The adhesive layer can play a flattening role to ensure the subsequent adhesion reliability with the carrier substrate.

In step 711, the carrier substrate is fixedly attached to a surface of the adhesive layer distal from the base substrate.

Figure 22:
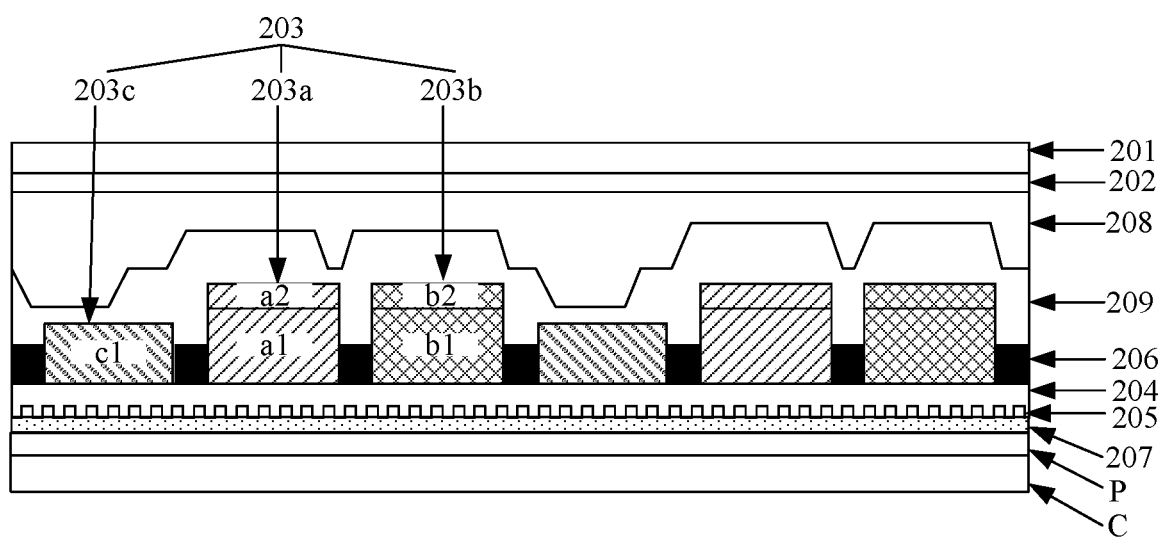
FIG. 22 is a schematic diagram after a carrier substrate is fixedly attached to a surface of the adhesive layer distal from the base substrate according to an embodiment of the present disclosure.

FIG. 22 is a schematic diagram after the carrier substrate 201 is fixedly attached to a surface of the adhesive layer 202 distal from the base substrate C according to an embodiment of the present disclosure. The carrier substrate 201 may be placed on the surface of the adhesive layer 202 distal from the base substrate C, such that the surface of the carrier substrate 201 is in contact with the surface of the adhesive layer 202 distal from the base substrate C. A pressure is then applied to the carrier substrate 201, such that the carrier substrate 201 is fixedly attached to the adhesive layer 202.

In step 712, the base substrate is peeled off to obtain the display substrate.

Optionally, the base substrate C may be subjected to heat treatment from one side of the base substrate C distal from the carrier substrate 201, such that heat is conducted to the adhesive layer P through the base substrate C. The adhesive layer P fails under the action of heat, and the adhesion force between the adhesive layer P and the protective layer 207 is removed, thereby peeling off the substrate C. It is readily understood that the adhesive layer P is peeled off when the base substrate C is peeled off. A display substrate may be obtained after the base substrate C and the adhesive layer P are peeled off. The structure of the display substrate is as illustrated in FIG. 5.

It is readily understood by a person skilled in the art that a peeling interface formed by peeling generally has a relatively large surface roughness. The surface roughness of the peeling interface of the display substrate according to the embodiment of the present disclosure can reach a target range (micron level). For example, the surface roughness of the peeling interface ranges from 0.4 microns to 1.6 microns. The range of surface roughness of the peeling interface is related to materials of film layers at which the peeling interface is disposed, and peeling process parameters. When the materials of the film layers where the peeling interface is disposed are different and/or the peeling process parameters are different, the range of the surface roughness of the peeling interface may be different as well.

Compared with the black matrix in the traditional color film substrate, the light shielding pattern in the display substrate according to the embodiment of the present disclosure is closer to the metal wire grid layer. When one side of the carrier substrate distal from the metal wire grid layer is a light exiting side of the display substrate, the light shielding pattern in the embodiment of the present disclosure is closer to the backlight module. When the light according to the backlight module is incident from one side of the metal wire grid layer distal from the light shielding pattern, the closer the light shielding pattern distal from the metal wire grid layer, the shorter a transmissible distance of incident light for illuminating a target pixel between the metal wire grid layer and the light shielding pattern, and accordingly, the less incident light having a large viewing angle (referring to incident light having an incident angle greater than a specified angle) in the incident light, that may be transmitted to a pixel region adjacent to the target pixel, which contributes to reducing cross color between adjacent pixels and improving the display effect.

It is readily understood by a person skilled in the art that the steps of the method for manufacturing the display substrate according to the embodiment of the present disclosure may be appropriately adjusted, or increased or decreased correspondingly according to actual situations. Any method that may be easily conceived by a person skilled in the art within the technical scope of the present disclosure is intended to be included in the protection scope of the present disclosure and therefore will not be described again.

In summary, according to the method for manufacturing the display substrate according to the embodiment of the present disclosure, the display substrate is obtained by sequentially forming the metal wire grid layer, the first flat layer, the light shielding pattern, the color resist layer and the adhesive layer on the base substrate, fixedly attaching the carrier substrate to a surface of the adhesive layer distal from the base substrate, and then peeling off the base substrate. The metal wire grid layer is formed on the base substrate, and the surface of the base substrate has high flatness, which contributes to avoiding the dimensional deviation of the metal wire grid layer and structural loss of part of regions, increasing the yield of the metal wire grid layer and improving the display effect of the display panel. In addition, when one side of the carrier substrate distal from the protective layer is the light exiting side of the display substrate, the distance between the light shielding pattern in the display substrate and the backlight module in the display device is reduced, and thus the cross color between adjacent pixels may be reduced.

The term "and/or" in the present disclosure merely describes the association relationship between the associated objects and indicates that there may be three relationships; for example, A and/or B may indicate three cases where only A exists, A and B exist at the same time, and only B exists. The character "/" in the present disclosure generally indicates that the relationship between the former and later associated objects is optional.

The term "at least one of A and B" in the present disclosure merely describes the association relationship between the associated objects and indicates that there may be three relationships; for example, at least one of A and B may indicate three cases where only A exists, A and B exist at the same time, or only B exists. Similarly, "at least one of A, B or C" indicates that there may be seven relationships and may indicate seven cases where only A exists, only B exists, only C exits, A and B exist at the same time, A and C exist at the same time, C and B exist at the same time, or A, B and C exit at the same time.

Described above are only to alternative embodiments of the present disclosure, and is not intended to limit the present disclosure. Any modifications, equivalent substitutions or improvements made within the spirit and principles of the present disclosure are intended to be included within the protection scope of the present disclosure.

What is claimed is:

1. A display substrate, comprising:
   a carrier substrate;
   an adhesive layer, a color resist layer, a first flat layer and a metal wire grid layer that are distributed in a direction distal from the carrier substrate; and
   a light shielding pattern disposed between the adhesive layer and the first flat layer;
   wherein the color resist layer is disposed between the adhesive layer and the first flat layer, a surface of the light shielding pattern proximal to the metal wire grid layer is in the same plane as a surface of the color resist layer proximal to the metal wire grid layer; and both the color resist layer and the light shielding pattern are disposed on one side of the first flat layer distal from the metal wire grid layer.

2. The display substrate according to claim 1, wherein flatness of a surface of the first flat layer proximal to the color resist layer is greater than flatness of a surface of the first flat layer distal from the color resist layer.

3. The display substrate according to claim 1, further comprising:
   a protective layer disposed on one side of the metal wire grid layer distal from the carrier substrate.

4. The display substrate according to claim 1, further comprising:
   a second flat layer disposed between the adhesive layer and the color resist layer.

5. The display substrate according to claim 4, further comprising:
   a third flat layer disposed between the second flat layer and the color resist layer.

6. The display substrate according to claim 5, wherein flatness of a surface of the second flat layer proximal to the adhesive layer is greater than flatness of a surface of the third flat layer distal from the adhesive layer.

7. The display substrate according to claim 1, wherein the color resist layer comprises at least one of a red color resist or a green color resist, the red color resist comprising a red quantum dot layer, and the green color resist comprising a green quantum dot layer.

8. The display substrate according to claim 7, wherein the color resist layer further comprises a blue color resist, the blue color resist comprising a blue filter layer; and the red color resist further comprises a red filter layer, and the green color resist further comprises a green filter layer, wherein an orthographic projection of the red filter layer on the red quantum dot layer covers the red quantum dot layer, and an orthographic projection of the green filter layer on the green quantum dot layer covers the green quantum dot layer.

9. The display substrate according to claim 2, further comprising:
   a protective layer disposed on one side of the metal wire grid layer distal from the carrier substrate;
   a second flat layer disposed between the adhesive layer and the color resist layer; and
   a third flat layer disposed between the second flat layer and the color resist layer, flatness of a surface of the second flat layer proximal to the adhesive layer being greater than flatness of a surface of the third flat layer distal from the adhesive layer;
   wherein the color resist layer comprises at least one of a red color resist, a green color resist, or a blue color resist; the red color resist comprising a red quantum dot layer and a red filter layer, wherein an orthographic projection of the red filter layer on the red quantum dot layer covers the red quantum dot layer; the green color resist comprising a green quantum dot layer and a green filter layer, wherein an orthographic projection of the green filter layer on the green quantum dot layer covers the green quantum dot layer; and the blue color resist comprising a blue filter layer.

10. A display panel, comprising a display substrate, wherein the display substrate comprises:
   a carrier substrate;
   an adhesive layer, a color resist layer, a first flat layer and a metal wire grid layer that are distributed in a direction distal from the carrier substrate; and
   a light shielding pattern disposed between the adhesive layer and the first flat layer;
   wherein the color resist layer is disposed between the adhesive layer and the first flat layer, a surface of the light shielding pattern proximal to the metal wire grid layer is in the same plane as a surface of the color resist layer proximal to the metal wire grid layer; and both the color resist layer and the light shielding pattern are disposed on one side of the first flat layer distal from the metal wire grid layer.

11. The display panel according to claim 10, wherein the display substrate is a color film substrate, and the display panel further comprises:
   an array substrate facing the display substrate; and
   a liquid crystal layer disposed between the array substrate and the display substrate.

12. A display device, comprising a backlight module, and the display panel according to claim 10.

13. A method for manufacturing a display substrate, comprising:
   providing a base substrate and a carrier substrate;
   forming a metal wire grid layer on one side of the base substrate;
   forming a first flat layer on one side of the metal wire grid layer distal from the base substrate;
   forming a light shielding pattern on one side of the first flat layer distal from the base substrate;
   forming a color resist layer on one side of the first flat layer distal from the base substrate;
   forming an adhesive layer on one side of the color resist layer distal from the base substrate;
   fixedly attaching the carrier substrate to a surface of the adhesive layer distal from the base substrate; and
   peeling off the base substrate to obtain the display substrate,
   wherein the color resist layer is disposed between the adhesive layer and the first flat layer, a surface of the color resist layer proximal to the metal wire grid layer is in the same plane as a surface of the light shielding pattern proximal to the metal wire grid layer, and both the color resist layer and the light shielding pattern are disposed on one side of the first flat layer distal from the metal wire grid layer.

14. The method according to claim 13, wherein
   prior to the forming a metal wire grid layer on one side of the base substrate, the method further comprises:
   forming a protective layer on one side of the base substrate; and
   the forming a metal wire grid layer on one side of the base substrate comprises:
   forming the metal wire grid layer on one side of the protective layer distal from the base substrate.

15. The method according to claim 13, wherein
   upon the forming a color resist layer on one side of the first flat layer distal from the base substrate, the method further comprises:
   forming a third flat layer on one side of the color resist layer distal from the base substrate; and
   the forming an adhesive layer on one side of the color resist layer distal from the base substrate comprises:
   forming the adhesive layer on one side of the third flat layer distal from the base substrate.

16. The method according to claim 15, wherein
   upon the forming a third flat layer on one side of the color resist layer distal from the base substrate, the method further comprises:
   forming a second flat layer on one side of the third flat layer distal from the base substrate, wherein the flatness of a surface of the second flat layer distal from the color resist layer is greater than the flatness of a surface of the third flat layer proximal to the color resist layer; and
   the forming the adhesive layer on one side of the third flat layer distal from the base substrate comprises:
   forming the adhesive layer on one side of the second flat layer distal from the base substrate.

17. The method according to claim 13, wherein
   the forming a color resist layer on one side of the first flat layer distal from the base substrate comprises:
   forming a quantum dot color film layer on one side of the first flat layer distal from the base substrate, the quantum dot color film layer comprising a red quantum dot layer and a green quantum dot layer; and
   forming a filter color film layer on the base substrate on which the quantum dot color film layer is formed, wherein the filter color film layer comprises a red filter layer, a green filter layer and a blue filter layer; an orthographic projection of the red filter layer on the red quantum dot layer covering the red quantum dot layer, and an orthographic projection of the green filter layer on the green quantum dot layer covering the green quantum dot layer.

18. The method according to claim 13, wherein
   the forming a metal wire grid layer on one side of the base substrate comprises:
   forming a metal layer on one side of the base substrate;

forming an imprinted adhesive layer on one side of the metal layer distal from the base substrate;

imprinting the imprinted adhesive layer by nanoimprinting to obtain an imprinted pattern;

etching the imprinted pattern and the metal layer; and peeling off the remaining imprinted pattern to obtain the metal wire grid layer.

19. The method according to claim 14, wherein prior to the forming a protective layer on one side of the base substrate, the method further comprises:

forming an adhesive layer on one side of the base substrate;

the forming a protective layer on one side of the base substrate comprises:

forming the protective layer on one side of the adhesive layer distal from the base substrate; and the peeling off the base substrate comprises:

performing heat treatment on the base substrate from one side of the base substrate distal from the carrier substrate such that the adhesive layer fails and peeling off the base substrate.

\* \* \* \* \*